United States Patent
Tsirkin

(10) Patent No.: US 11,537,422 B2
(45) Date of Patent: Dec. 27, 2022

(54) VIRTUAL MACHINE MIGRATION DOWNTIME REDUCTION USING A MULTICAST ADDRESS

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

(*) Notice: Subject to any disclaimer, the term of this patent is extended or adjusted under 35 U.S.C. 154(b) by 485 days.

(21) Appl. No.: 16/689,413

(22) Filed: Nov. 20, 2019

(65) Prior Publication Data
US 2021/0149702 A1 May 20, 2021

(51) Int. Cl.
*G06F 9/455* (2018.01)
*H04L 12/18* (2006.01)
*H04L 65/611* (2022.01)
*H04L 101/622* (2022.01)

(52) U.S. Cl.
CPC ........ *G06F 9/45558* (2013.01); *H04L 12/185* (2013.01); *H04L 65/611* (2022.05); *G06F 2009/4557* (2013.01); *H04L 2101/622* (2022.05)

(58) Field of Classification Search
CPC ........ G06F 9/45558; G06F 2009/4557; H04L 12/185; H04L 61/6022; H04L 65/4076; H04L 2101/622; H04L 65/611
See application file for complete search history.

(56) References Cited

U.S. PATENT DOCUMENTS

| | | | |
|---|---|---|---|
| 8,693,343 B2 | 4/2014 | Nakagawa | |
| 8,953,590 B1 | 2/2015 | Aggarwal et al. | |
| 9,880,870 B1* | 1/2018 | Danilov | G06F 9/45558 |
| 9,900,263 B2 | 2/2018 | Garcia del Rio | |
| 11,010,084 B2* | 5/2021 | Dawkins | G06F 3/0647 |
| 2011/0205904 A1* | 8/2011 | Nakagawa | H04L 12/18 370/390 |
| 2012/0124309 A1* | 5/2012 | Watanabe | G06F 3/0647 711/E12.103 |
| 2014/0223435 A1 | 8/2014 | Chang | |
| 2014/0301391 A1* | 10/2014 | Krishnan | G06F 9/45558 370/392 |
| 2015/0169351 A1* | 6/2015 | Song | H04L 12/4641 718/1 |
| 2019/0215175 A1 | 7/2019 | Mathew et al. | |

OTHER PUBLICATIONS

Nakagawa, Yukihiro, et al., Fujitsu Laboratories Ltd.;Kawasaki, Kanagawa, Japan, "A Management Method of IP Multicast in Overlay Networks Using Openflow", https://www.researchgate.net/publication/254462954_A_management_method_of_IP_multicast_in_overlay_networks_using_openflow, Aug. 2012, 6 pages.
"Edit the Number of Source IP Addresses for IGMP and MLD", https://docs.vmware.com/en/VMware-vSphere/6.0/com.vmware.vsphere.networking.doc/GUID-E2E32DA6-5B01-4410-9269-9EA74FB9B6F5.html, May 31, 2019, 1 page.

* cited by examiner

*Primary Examiner* — Mohamed A. Wasel
(74) *Attorney, Agent, or Firm* — Lowenstein Sandler LLP

(57) ABSTRACT

A migration process for migration of a virtual machine from a source host to a destination host has initiated is determined. The source host and the destination host are part of a network. A multicast address that is mapped to a group comprising the source host and the destination host is obtained. Host in the network to begin encapsulating packets addressed to the virtual machine and send the encapsulated packets using the multicast address in a destination address field of the encapsulated packets is notified.

17 Claims, 6 Drawing Sheets

VIRTUAL MACHINE MIGRATION DOWNTIME REDUCTION USING A MULTICAST ADDRESS

TECHNICAL FIELD

The disclosure is generally related to virtualization systems, and is more specifically related to virtual machine (VM) migration downtime reduction using a multicast address.

BACKGROUND

Data centers may include clusters of multiple hosts (e.g., physical servers) in racks. Hypervisors may operate on each host to create and run virtual machines (VMs). VMs emulate computer systems and may be referred to as guest machines. The hosts in the clusters may be connected via one or more wired (e.g., Ethernet) and/or wireless (e.g., WiFi) networks (e.g., the Internet, local area network (LAN)). In some instances, a VM on a source host machine may be migrated to a destination host machine within the cluster. To communicate with the migrated VM on the destination host, various components of the networks may be updated with address updates for the VM.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
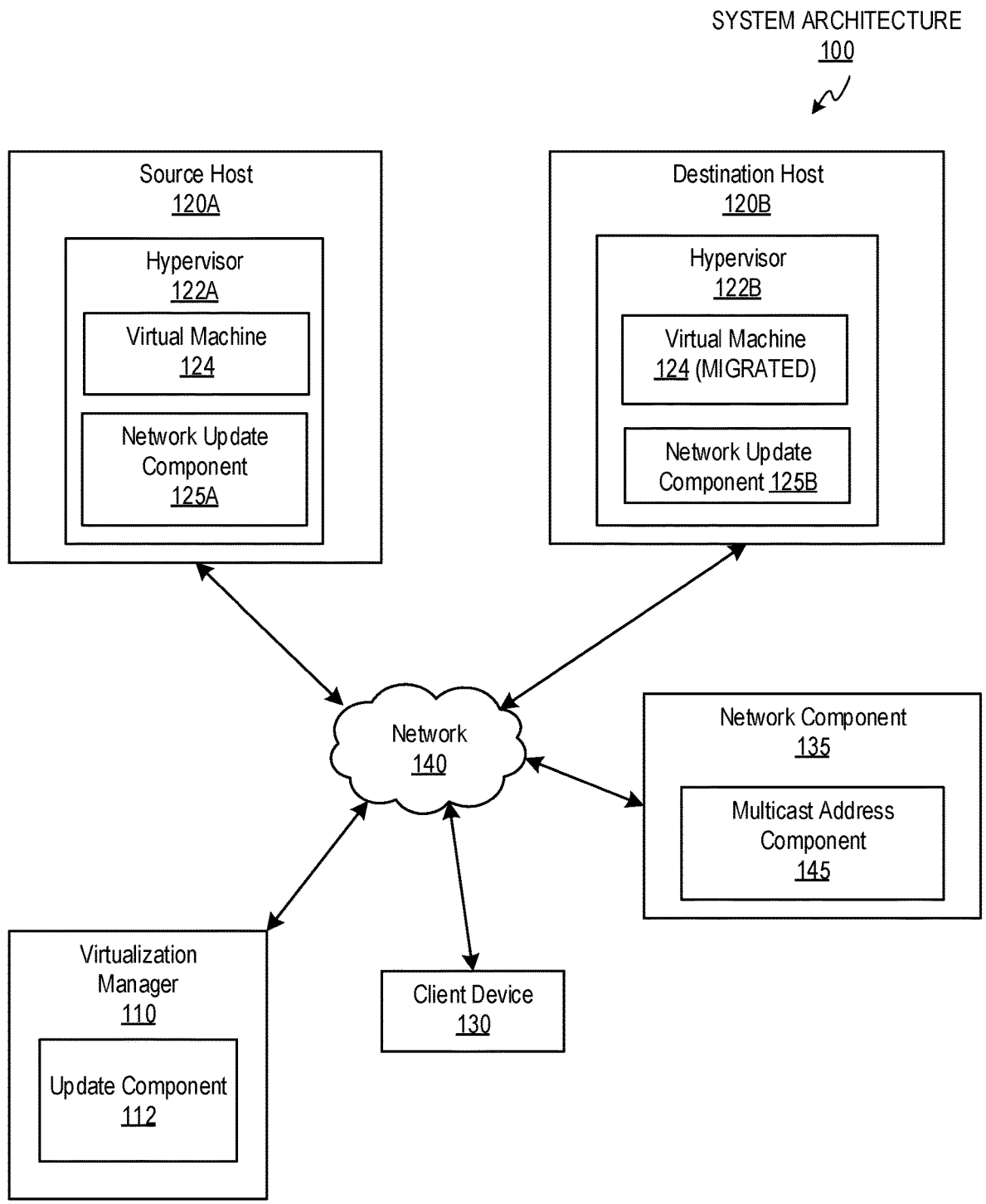
FIG. 1 depicts a high-level diagram of an example system architecture operating in accordance with one or more aspects of the disclosure.

Implementations of the disclosure are directed to virtual machine (VM) migration downtime reduction using a multicast address. A VM may execute via a source hypervisor on a source host machine (also referred to as a source host) in a managed virtualization environment The VM may be associated with a first address (e.g., a media access control (MAC) address tagged with a virtual local area network (VLAN) address) that corresponds to the source host. The source host may be connected to other hosts via a network. As the VM or the hypervisor sends packets from the source host across the network to other hosts, components (e.g., switches) of the network may inspect the packets and determine that the first address of the VM is coming from a port associated with the source host. This information may be added to a forwarding table maintained by each of the components of the network. As such, when components receive packets from other hosts that include a destination address set to the address of the VM, the component may forward the packets using the port to the source host.

In some instances, a topology of the network may change, for example, when a VM executing on the source host is migrated to a destination host machine (also referred to as a destination host). The network previously observed that packets from the VM were being sent from the address and port, but the VM may now be at a new location (e.g., the destination host) in the network and may send packets associated with a different port. Thus, packets from the VM may arrive from a different direction on the different port (e.g., incoming port) at components in the network.

Conventionally, in some instances, the destination host may broadcast a notification packet (e.g., reverse address resolution protocol (RARP) packet) using the address of the VM as the source address field in the packet. This notification packet may cause the components of the network to update forwarding tables at the components with the address and different port to enable packets to be sent from and forwarded to the VM at its new location (e.g., on the destination host) in the network. However, the notification packets take time to propagate over the network. Furthermore, the notification packets may get lost or delayed and cause network disruption for the VM.

Aspects of the disclosure address the above and other deficiencies by providing VM migration downtime reduction using a multicast address. When a VM begins a migration process from a source host to a destination host, a network update component (e.g., of the source host, destination host, or a virtualization manager) may obtain a multicast address from a network component maintaining a pool of multicast addresses. The multicast address is mapped to a group including the source host and destination host. The network update component may then send a first notification packet to the hosts in the network to update the address of the VM. This first notification packet instructs components of the network to temporarily encapsulate the packets destined for the VM and to utilize the multicast address in source destination address field of those encapsulated packets. Encapsulation may refer to the process of abstracting logically separate functions in a network from their underlying structures by inclusion or information hiding within higher level objects.

As a result of the first notification packet, packets directed to the VM are received by both the source host and the destination host during the migration. Once migration is complete, the hosts of the network are notified with a second notification packet that identifies the destination host address. This second notification packet may also instruct the hosts to stop encapsulating the packets directed to the VM. Thereafter, packets destined for the VM are forwarded directly to the destination host.

Implementations of the disclosure utilize the advantages of multicast communications for improved reliability and performance of network communications in a virtualization system. The utilization of a multicast address during the migration process of the VM improves communication reliability as it reduces the number of packets dropped. This, in turn, improves performance and reliability in the network of a virtualization system.

FIG. 1 illustrates an example system architecture 100 in which implementations of the disclosure may operate. The system architecture 100 may include a virtualization manager 110, a plurality of host systems 120A (hereinafter "source host 120A") and 120B (hereinafter "destination host 120B"), a client device 130, a virtualization manager 110, and a network manager 135 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The source host 120A and the destination host 120B may comprise one or more processors communicatively coupled to memory devices and input/output (I/O) devices. The source host 120A and the destination host 120B may run a plurality of VMs by executing a hypervisor 122A and 122B, respectively, to abstract the physical layer, including processors, memory, and I/O devices, and present this abstraction to the VMs as virtual devices. For example, as depicted, hypervisor 122A may run VM 124. The VM 124 may execute a guest operating system that may utilize the underlying virtual devices, including virtual processors, virtual memory, and virtual I/O devices.

One or more applications may be running on a VM under the guest operating system. The hypervisors 122A and 122B may create, run, manage, and monitor various aspects of VMs operation, including the processing, and storage, memory, and network interfaces. In an illustrative example, hypervisors 122A and 122B may communicate with the virtualization manager 110 using a Virtual Desktop and Server Management (VDSM) daemon (not shown). The VDSM daemon may include an application programming interface (API) with which the virtualization manager 110 interfaces.

The VDSM or any suitable application executing on the source host 120A and the destination host 120B may provide status notifications to the virtualization manager 110 that indicate the operating state of the hypervisors 122A and 122B and/or the VMs 124. In an example, the hypervisors 122A and 122B may be connected to each other via the network 140 and may send notifications back and forth without sending the notifications to the virtualization manager 110. The status notification may be transmitted by the VDSM or other application when the VM 124 is successfully migrated to the destination host 120B and starts to execute on the destination host 120B via the hypervisor 122B. Additionally, the VDSM or any suitable application may provide a notification that indicates that the hypervisor 122B or the VM 124 sent out a notification packet that includes the VM address in a source address field over the network. Sending the notification packet may cause components (e.g., switches) to identify the address of the VM and update their forwarding tables with the different incoming ports at which the packets from the VM arrived. However, as noted above, the notification packet may not result in the network fully updating (e.g., when a notification packet is lost) and the techniques disclosed herein may be used to avoid and mitigate such broadcast issues.

The virtualization manager 110 may be hosted by a computer system and include one or more computer programs executed by the computer system for centralized management of the system architecture 100. In one implementation, the virtualization manager 110 may comprise various interfaces, including administrative interface, reporting interface, network address update interface, and/or application programming interface (API) to communicate with the client device 130, the source host 120A, and the destination host 120B of system architecture 100, as well as to user portals, directory servers, and various other components, which are omitted from FIG. 1 for clarity. The update component 112 of the virtualization manager 110 may be implemented as computer instructions stored on one or more tangible, non-transitory computer-readable media executed by one or more processing devices of the computer system hosting the virtualization manager 110.

Virtualization manager 110 may provide VM migration management to migrate existing VMs (e.g., VM 124) from one host (e.g., source host 120A) to a second host (e.g., destination host 120B). In one example, an administrator may use the client device 130 (e.g., laptop, desktop, tablet, smartphone, server) to request migration of the VM 124 to the destination host 120B. The migration may include copying various data structures (e.g., disks, volumes, etc.) associated with the VM 124 from the source host 120A to the destination host 120B, starting the VM 124 on the destination host 120B, and/or stopping the VM 124 on the source host 120A. In some implementations, the update component 112 of the virtualization manager 110 may be used to perform one or more actions associated with updating a network address of a migrating VM 124 using a multicast address, as described below. The techniques disclosed herein may enable improving performance of the system 100 by reducing network latency resulting from the network not fully updating due to delay in delivery or loss of notification packets that identify the address of the migrated VM 124.

In implementations of the disclosure, VM migration downtime is reduced by utilizing multicast addresses. In an example, the source host 120A may include a network update component 125A. The network update component 125A may be implemented as computer instructions stored on one or more memories and executed by one or more processing devices of the source host 120A. In an example, the network update component 125A on the source host 120A may be part of the hypervisor 122A. In another example, the network update component 125A on the source host 120A may interface with the hypervisor 122A. There may also be one or more network update components 125A, 125B installed throughout the network 140. The network update components 125A, 125B may be installed on each host 120A, 120B in the network 140 or on just a subset of the hosts in the network 140.

There may also be one or more network components 135 installed throughout the network 140. The network components 135 may be various networking components (e.g., host systems in a cluster, switches, relays, etc.) in the network 140. In one implementation, the network component 135 may include a multicast address component 145. The multicast address component 145 may be computer instructions stored on one or more memories and executed by one or more processing devices of the network component 135.

To help reduce network downtime during VM migration due to loss, misplacement, or other delay of notification packets, network component 135 utilizes multicast address component 145 to maintain a pool of multicast addresses for use during a VM migration process. Multicasting may refer to the transmission of an Internet Protocol (IP) datagram to a group of hosts identified by a single IP destination address. In addition to this common multicast group address, the hosts in the group all have separate and unique unicast addresses (e.g., the VM 124, prior to migration, may be associated with a first address (e.g., a media access control (MAC) address tagged with a virtual local area network (VLAN) address) that corresponds to the source host 120A). The actual multicast host group can consist of any number of hosts, possibly even located in different networks. When multicasting is implemented at the data link layer, devices are identified by their Media Access Control (MAC) addresses as well as their network level IP addresses. The devices with a given multicast MAC defined are able to listen to all traffic sent to that particular MAC address.

When a migration process begins for the VM 124 in the system 100, a network address update process for the VM 124 is implemented as part of the migration process. In one implementation, the network update component 125A of source host 120A, the network update component 125B of destination host 120B, and/or the update component 112 of virtualization manager 110, individually or in combination, may perform the network address update process. For illustrative purposes, the following description refers to the network update component 125A of source host 120A as performing aspects of the network address update process. However, implementations of the disclosure are not limited to the network update component 125A performing the network address update process and other components may also perform such process.

As part of the network address update process, the network update component 125A of source host 120A may receive a migration indication from the virtualization manager 110 that the VM migration process is beginning. In some implementations, the network update component 125B of the destination host 120B may also receive a migration indication from the virtualization manager 110 regarding the VM migration process beginning. The migration indication may indicate that the VM 124 is to be migrated from the source host 120A to the destination host 120B. The migration indication may also include the address of the VM 124.

In response to receiving the migration indication, the network update component 125A may obtain a multicast address from a pool of multicast addresses maintained by the multicast address component 145. In one implementation, the source host 120A and/or the destination host 120B may send Internet Group Management Protocol (IGMP) packets to join a multicast group associated with the multicast address obtained from the multicast address component 145. In some implementations, the source host 120A may initially send the request to join the multicast group upon initiation of the VM migration process. In some implementations, the destination host 120B sends the request to join the multicast group at a subsequent time during the VM migration process, but prior to the completion of the VM migration process. In some implementations, the destination host 120B sends the request to join the multicast group upon initiation of the VM migration process. The multicast address component 145 may maintain a data structure or other mapping that associates hosts (e.g., source host 120A, destination host 120B, etc.) in the network 140 with particular multicast addresses.

Once the multicast address is obtained, a first notification packet is sent to the hosts (e.g., source host 120A, destination host 120B, and all other hosts not shown) in the system 100. The first notification packet may notify each host in the network 140 to temporarily encapsulate each packet destined for the VM 124 and also to address such packets to the obtained multicast address. As noted above, in one implementation, the network update component 125A of the source host 120A may send the first notification packet to the hosts in the network. In some implementations, the network update component 125B of the destination host 120B or the update component 112 of the virtualization manager 110 may send the first notification packet to the hosts in the network. In some implementations, the first notification packet is sent as a broadcast communication on the network.

As noted above, the first notification packet instructs hosts to encapsulate all packets destined for the VM 124. Encapsulation may refer to the process of abstracting logically separate functions in a network from their underlying structures by inclusion or information hiding within higher level objects. In one implementation, encapsulation takes data from one protocol and translates it into another protocol, so that the data can continue across a network. During encapsulation, each layer of a communications stack builds a protocol data unit (PDU) by adding a header (and sometimes a trailer) containing control information to a service data unit (SDU) from the layer above. For example, in the Internet Protocol (IP) protocol, the contents of a web page are encapsulated with an HyperText Transport Protocol (HTTP) header, then by a Transmission Control Protocol (TCP) header, and finally by a frame header and trailer. The frame is forwarded to the destination node as a stream of bits, where it is de-encapsulated into the respective PDUs and interpreted at each layer by the receiving node.

Once hosts in the network 140 begin encapsulating and utilizing the multicast address for packets addressed to the VM 140, the packets for the VM 124 are then received by hosts corresponding to the group mapped to the multicast address. As discussed above, this multicast group includes the source host 120A and the destination host 120B during the VM migration process. In some implementations, the destination host 120B can discard packets received via the multicast address if the VM migration did not yet complete. Similarly, the source host 120A can discard packets received via the multicast address if migration did complete successfully.

Once migration is complete, all hosts in the network 140 may again be notified with a second notification packet. This second notification packet may identify the destination address of the VM 124 at the destination host 120B. In one implementation, the network update component 125B of the destination host 120B may send the second notification packet that includes the new destination host 120B address for the VM 124. In some implementations, the update component 112 of the virtualization manager 110 may send the second notification packet. In one implementation, the second notification packet may be sent as a broadcast message to all hosts in the network 140. As a result of the second notification packet, packets directed to the VM 124 are forwarded directly to the destination host 120B by the hosts in the network 140. The multicast address can then be reused by the multicast address component 145.

With respect to encapsulation, some networks may already implement encapsulation as part of the networking protocol, while other networks may not implement encapsulation. For implementations of the disclosure that are applied in a network 140 that already implements encapsulation in the networking protocol, the first notification packet that is sent upon initiation of the migration process may specify to switch the source address used in the encapsulation from the source host 120A address to the multicast address. Similarly, the second notification that is sent once the migration process is complete may specify to switch over to using the destination host 120B address in the encapsulation in lieu of the multicast address. In this implementation, the encapsulation remains in place and the destination address is modified from unicast to multicast and then back to unicast.

For implementations of the disclosure applied in a network 140 that does not utilize encapsulation in its networking protocol, the first notification packet sent upon migration initiation may specify to begin encapsulating packets and to utilize the multicast address in the encapsulation. Similarly, the second notification packet sent once the migration process is complete may specify to stop encapsulating. In some implementations, this second notification packet may not necessarily identify the destination host 120B address. In this case, the second notification packet may cause hosts to remove the encapsulation and perform a lookup (e.g., of a forwarding table maintained at each host) to determine the new network address of the VM 124 at the destination host 120B for use in sending packets to the VM 124.

Figure 2:
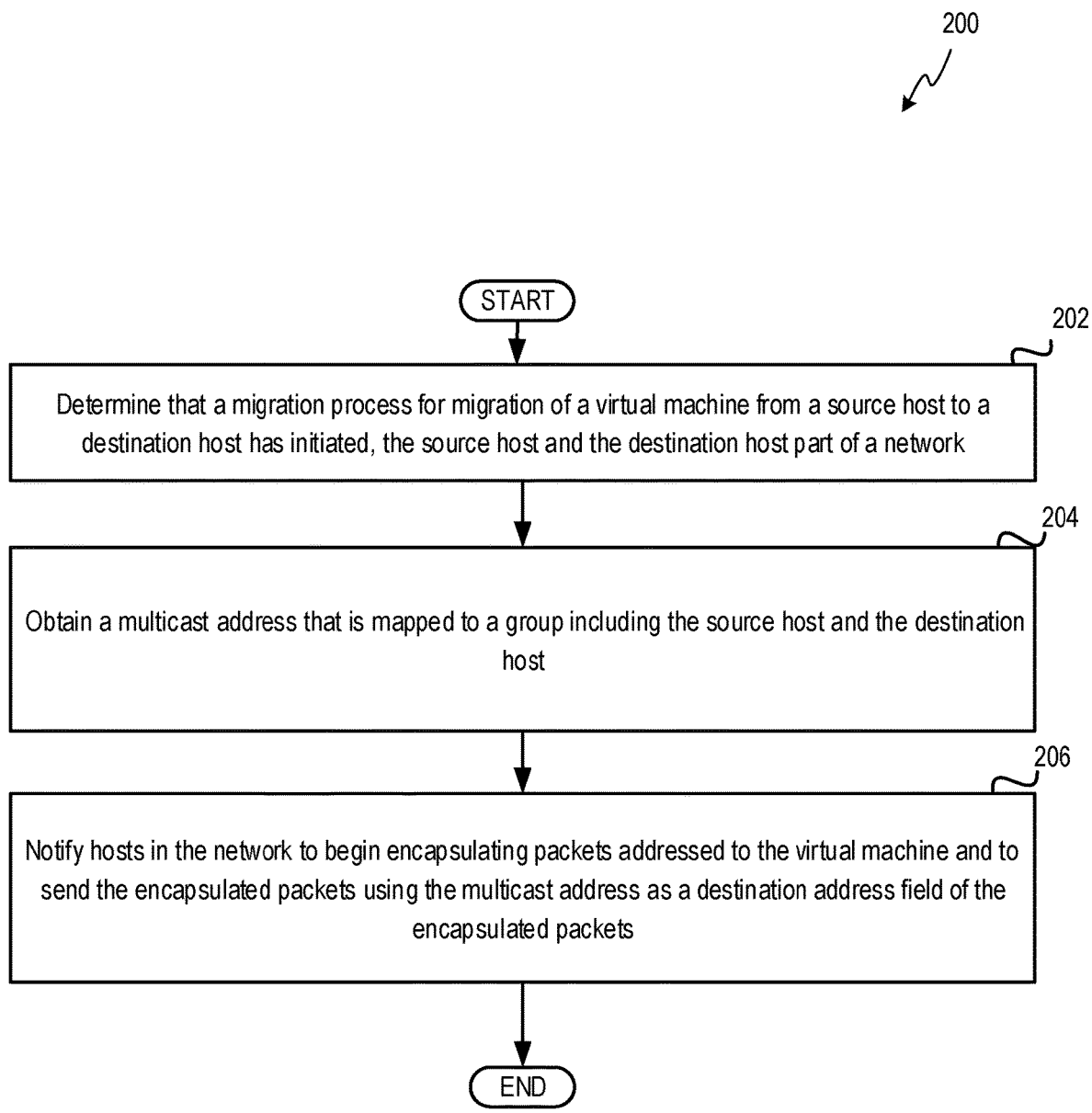
FIG. 2 depicts a flow diagram of an example method for virtual machine (VM) migration downtime reduction using a multicast address, in accordance with one or more aspects of the disclosure.

FIG. 2 depicts a flow diagram of an example method 200 for VM migration downtime reduction using a multicast address, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the network update component 125A executed by one or more processing devices of the source host 120A, or by network update component 125B executed by one or more processing devices of the destination host 120B. In some implementations, method 200 may be performed by update component 122 executed by one or more processing devices of the virtualization manager 110.

Method 200 may begin at block 202. At block 202, a processing device may determine that a migration process for migration of a VM from a source host to a destination host has initiating, wherein the source host and the destination host are part of a network. In one implementation, the processing device may receive a migration indication from a virtualization manager indicating that the VM migration process is beginning. The migration indication may indicate that the VM is to be migrated from the source host to the destination host. The migration indication may also include the address of the VM.

At block 204, the processing device may obtain a multicast address that is mapped to a group comprising the source host and the destination host. In one implementation, the multicast address is obtained from a multicast address component of the network, where the multicast address component maintains a pool of multicast addresses for use by the network. The source host and/or the destination host may send IGMP packets to join a multicast group associated with the multicast address obtained from the multicast address component. The multicast address component may maintain a data structure or other mapping that associates hosts in the network with multicast addresses.

Lastly, at block 206, the processing device may notify hosts in the network to begin encapsulating packets addressed to the VM and to send the encapsulated packets using the multicast address as a destination address field of the encapsulated packets. As noted above, in one implementation, the network update component of the source host may send the notification packet to the hosts in the network. In some implementations, the network update component of the destination host or the update component of the virtualization manager may send the first notification packet to the hosts in the network. In some implementations, the notification packet is sent as a broadcast communication on the network. Once hosts in the network begin encapsulating and utilizing the multicast address for packets addressed to the VM, the packets for the VM are then received by hosts corresponding to the group mapped to the multicast address. This multicast group includes at least the source host initially, and then the destination host may be added to the group at any time during the VM migration process. In implementations, the destination host can discard packets received via the multicast address if the VM migration did not yet complete. Similarly, the source host can discard packets received via the multicast address if migration did complete successfully.

Figure 3:
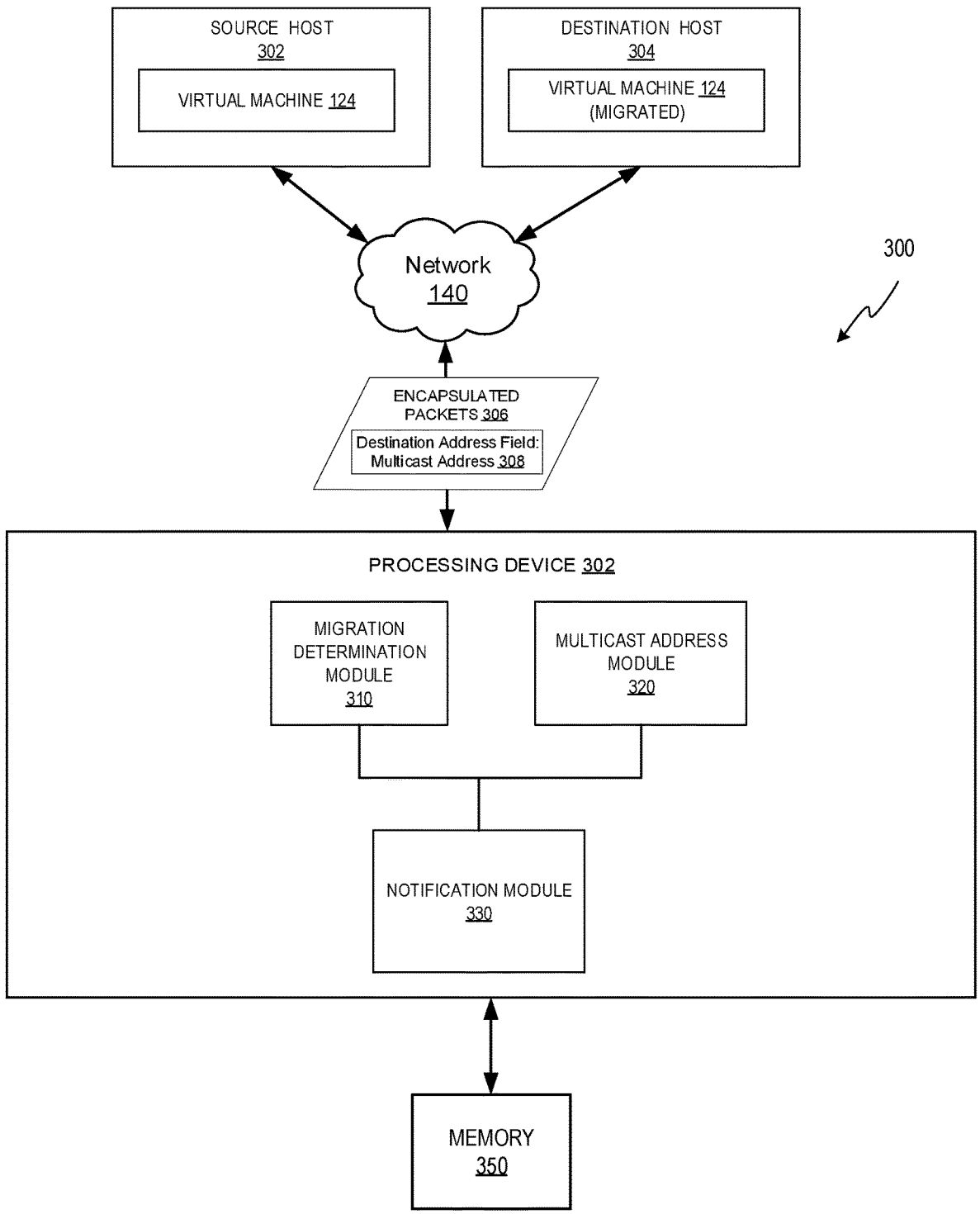
FIG. 3 depicts a block diagram of an example computer system, in accordance with one or more aspects of the disclosure.

FIG. 3 depicts a block diagram of an example computer system 300, in accordance with one or more aspects of the disclosure. Computer system 300 may be the same or similar to the computer system 110 and may include one or more processing devices 302 and one or more memory devices 350. Computer system 200 may also include a source host 302 and destination host 304 communicably coupled to the processing device 302 and memory 350 via network 140. Network 140 may be the same as network 140 described with respect to FIG. 1. Similarly, source host 302 may be same as source host 120A described with respect to FIG. 1 and destination host 304 may be the same as destination host 120B described with respect to FIG. 1. As shown in FIG. 3, source host 302 includes a VM 124 (which may be the same as VM 124 described with respect to FIG. 1) that is being migrated to destination host 304. Although not specifically illustrated, in some implementations, processing device 302 may be part of source host 302, or may be part of destination host 304. In one implementation, processing device 302 is part of a virtualization manager, such as virtualization manager 110 described with respect to FIG. 1.

In the example shown, the processing device 302 of the computer system 300 may include a migration determination module 310, a multicast address module 320, and a notification module 330. The migration determination module 310 may determine that a migration process for migration of the VM 124 from the source host 302 to the destination host 304 has initiated. In one implementation, the source host 302 and the destination host 304 are part of the network 140. The multicast address module 320 may obtain a multicast address that is mapped to a group comprising the source host 302 and the destination host 304. The notification module 330 may notify hosts 302, 304 in the network 140 to begin encapsulating packets 306 addressed to the VM 124 and send the encapsulated packets 306 using the multicast address as a destination address field 308 of the encapsulated packets 306.

Figure 4:
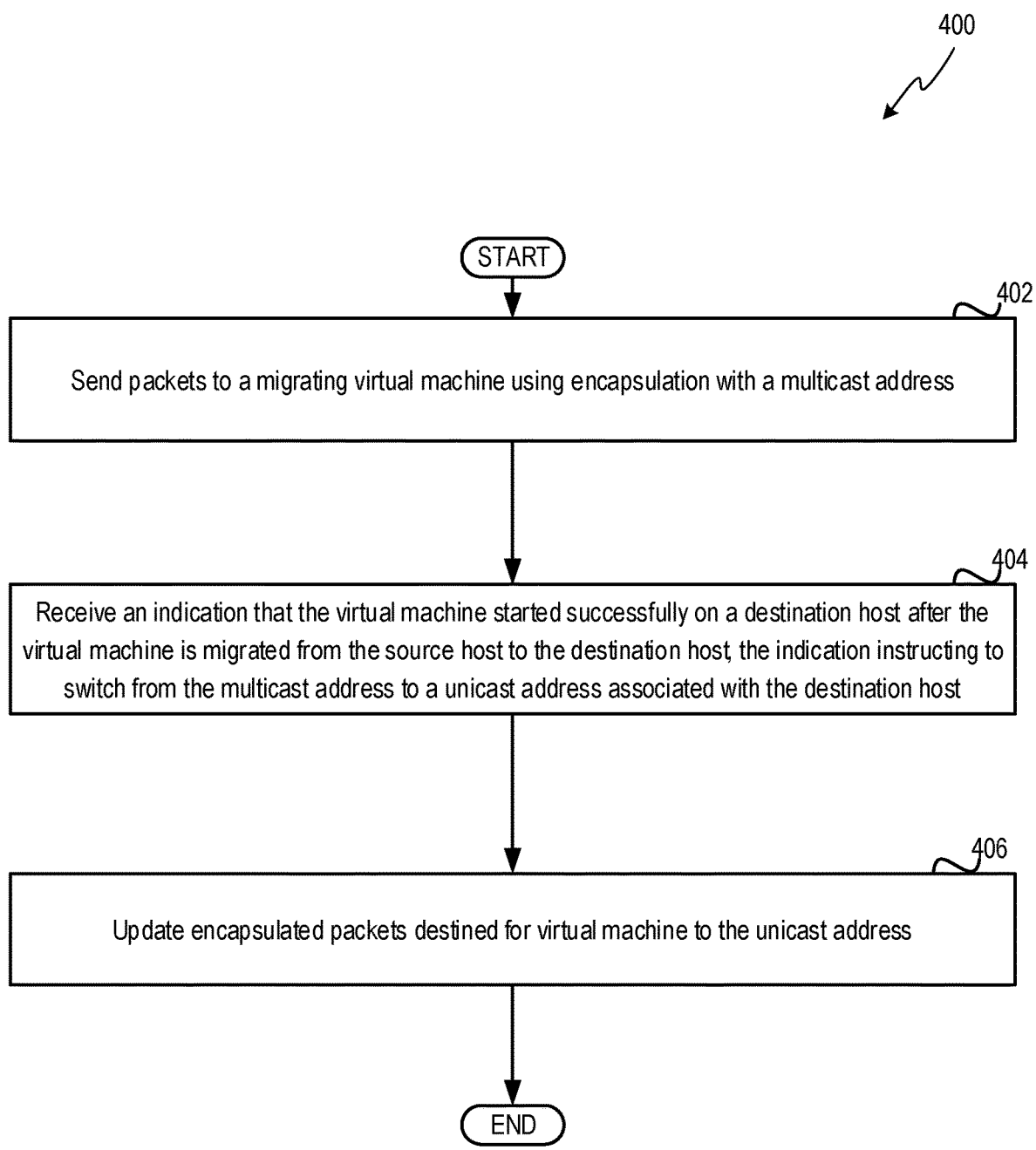
FIG. 4 depicts a flow diagram of an example method for VM migration downtime reduction using a multicast address in an encapsulated network, in accordance with one or more aspects of the disclosure.

FIG. 4 depicts a flow diagram of an example method 400 for VM migration downtime reduction using a multicast address in an encapsulated network, in accordance with one or more aspects of the disclosure. Method 400 includes operations performed by a system architecture 100. Also, method 400 may be performed in the same or a similar manner as described above in regards to method 200. Method 400 may be performed by processing devices of the system 100 executing the network update component 125A, 125B or update component 112. Method 400 may also be performed by processing devices of the system 100 comprised in hosts of the network 100.

Method 400 may begin at block 402. At block 402, the processing device may send packets to a migrating VM using encapsulation and a multicast address. In one implementation, the multicast address is mapped to a group including a source host and a destination host of the migrating VM. At block 404, the processing device may receive an indication that the VM started successfully on a destination host after the VM is migrated from the source host to the destination host. In one implementation, the indication instructs to switch from the multicast address to a unicast address associated with the destination host.

Lastly, at block 406, encapsulated packets destined for the VM are updated to utilize the unicast address of the destination host. In one implementation, updating the encapsulated packets refers to using the unicast address of the destination host in the destination address field of the encapsulated packets destined for the migrated VM.

Figure 5:
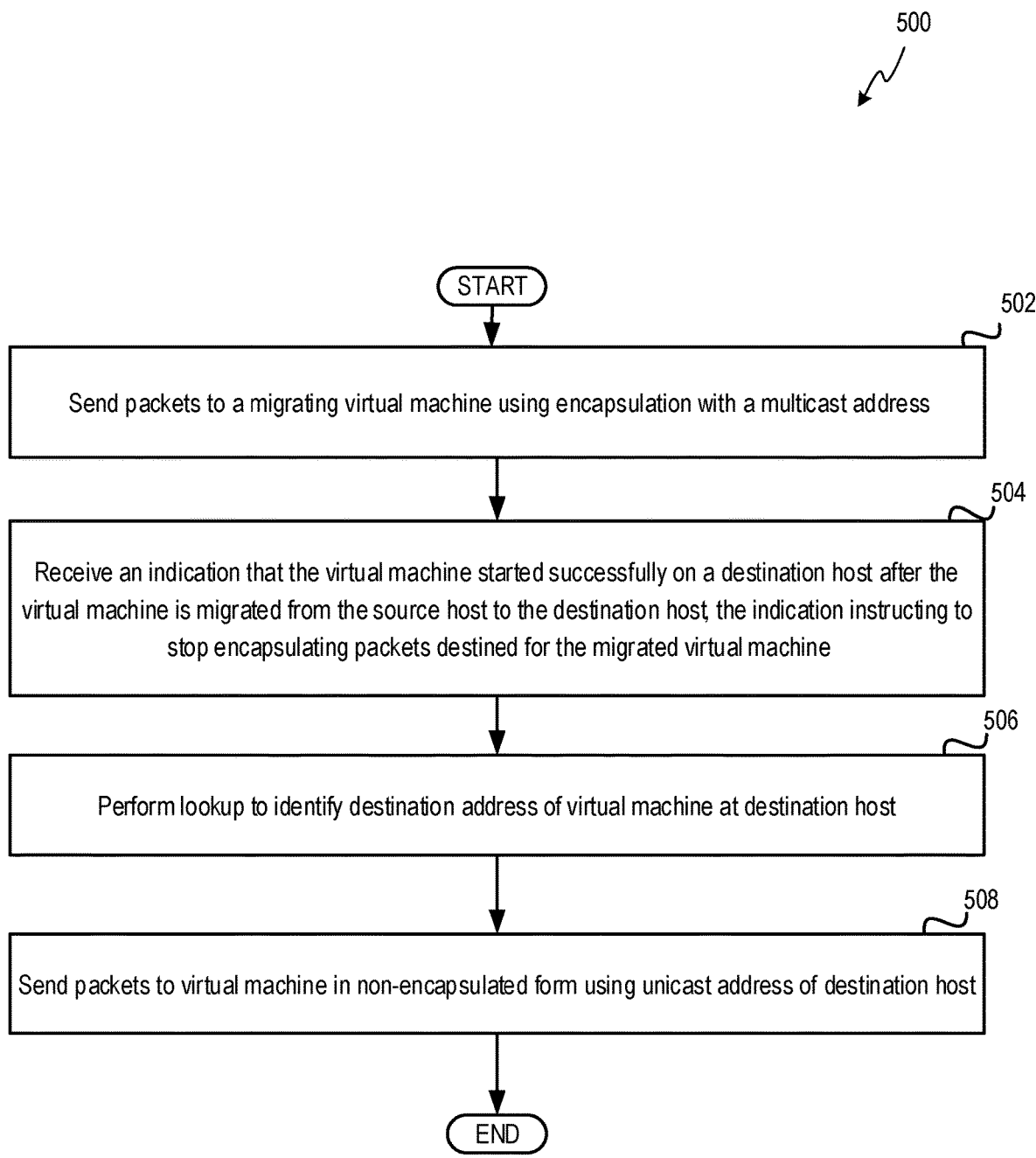
FIG. 5 depicts a flow diagram of an example method VM migration downtime reduction using a multicast address in a non-encapsulated network, in accordance with one or more aspects of the disclosure.

FIG. 5 depicts a flow diagram of an example method 500 for VM migration downtime reduction using a multicast address in a non-encapsulated network, in accordance with one or more aspects of the disclosure. Method 500 includes operations performed by the computer system 110. Also, method 500 may be performed in the same or a similar manner as described above in regards to methods 200 and/or 400. Method 400 may be performed by processing devices of the system 100 executing the network update component 125A, 125B or update component 112. Method 400 may also be performed by processing devices of the system 100 comprised in hosts of the network 100.

Method 500 may begin at block 502. At block 502, the processing device may send packets to a migrating VM using encapsulation and a multicast address. In one implementation, the multicast address is mapped to a group including a source host and a destination host of the migrating VM. At block 504, the processing device may receive an indication that the VM started successfully on a destination host after the VM is migrated from the source host to the destination host. In one implementation, the indication instructs to stop encapsulating packets destined for the migrated VM.

At block 506, the processing device may perform a lookup to identify a destination address of the VM at the destination host. In one implementation, each host includes a data structure maintaining network address information for network components in the network. The data structure may include a forwarding table maintained by the host that can be utilized for a lookup operation to identify the destination host address for the VM.

Lastly, at block 508, packets destined for the VM are updated to utilize the unicast address of the destination host and send to the VM in non-encapsulated form. In one implementation, utilizing the unicast address at block 508 refers to using the unicast address of the destination host in the destination address field of the non-encapsulated packets destined for the migrated VM.

Figure 6:
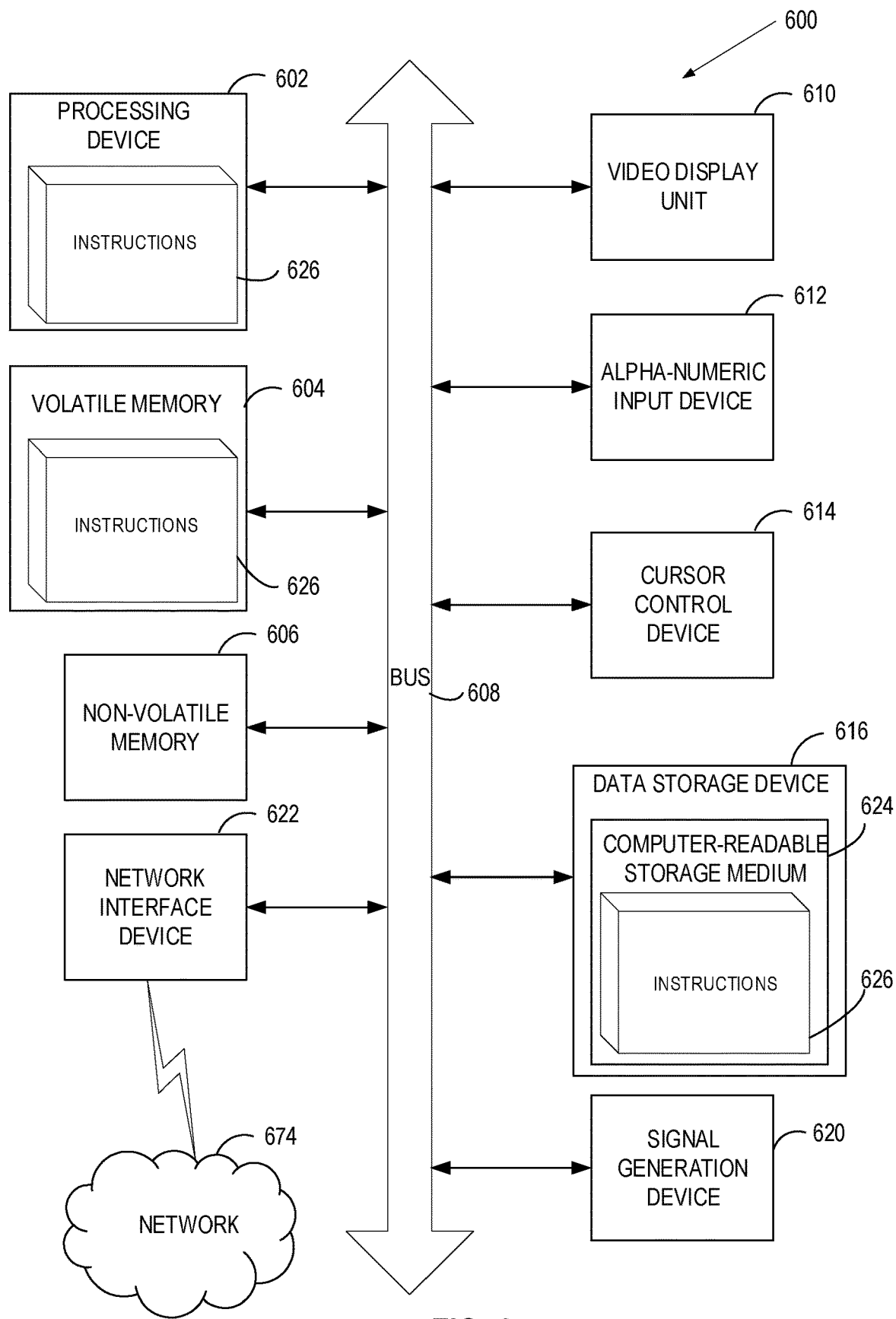
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a computing device 110 within system architecture 100 of FIG. 1. In one implementation, the computer system 600 may be the computer system 110 of FIG. 1. The computer system 600 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing method 200, method 400, and method 500 for VM migration downtime reduction using a multicast address, and the modules illustrated in FIGS. 1 and 3.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, and 500, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   determining, by a processing device, that a migration process for migration of a virtual machine from a source host to a destination host has initiated, wherein the source host and the destination host are part of a network, wherein the network comprises an encapsulated network;
   obtaining, by the processing device, a multicast address that is mapped to a group comprising the source host and the destination host; and
   notifying, by the processing device, hosts in the network to begin encapsulating packets addressed to the virtual machine and send the encapsulated packets using the multicast address in a destination address field of the encapsulated packets, wherein the notification to begin encapsulating the packets is to cause the hosts to switch from sending encapsulated packets addressed to the virtual machine using a unicast address of the source host to using the multicast address.

2. The method of claim 1, wherein a first network address of the source host is a media access control (MAC) address of the source host and wherein a second network address of the destination host is a MAC address of the destination host, wherein the packets addressed to the multicast address are sent to the first network address of the source host and the second network address of destination host.

3. The method of claim 1, wherein, responsive to the migration process being complete, the destination host to notify the hosts in the network to send the packets destined to the virtual machine using a network address of the destination host in the destination address field of the packets and to stop using the multicast address.

4. The method of claim 3, wherein the multicast address is reused after the hosts in the network stop using the multicast address for the virtual machine.

5. The method of claim 1, wherein the network comprises a non-encapsulated network, and wherein the notification to begin encapsulating the packets is to cause the hosts to add encapsulation to packets addressed to the virtual machine, the encapsulation comprising the multicast address.

6. The method of claim 1, wherein obtaining the multicast address further comprises sending an internet group management protocol (IGMP) request for the multicast address to a network component of the network.

7. The method of claim 1, wherein the processing device is comprised in at least one of the source host or the destination host.

8. The method of claim 1, wherein the processing device is comprised in a virtualization manager of the network.

9. A system comprising:
a memory;
a processing device operatively coupled to the memory, the processing device to:
  determine, by a processing device, that a migration process for migration of a virtual machine from a source host to a destination host has initiated, wherein the source host and the destination host are part of a network, wherein the network comprises an encapsulated network;
  obtain, by the processing device, a multicast address that is mapped to a group comprising the source host and the destination host; and
  notify, by the processing device, hosts in the network to begin encapsulating packets addressed to the virtual machine and send the encapsulated packets using the multicast address in a destination address field of the encapsulated packets, wherein the notification to begin encapsulating the packets is to cause the hosts to switch from sending encapsulated packets addressed to the virtual machine using a unicast address of the source host to using the multicast address.

10. The system of claim 9, wherein a first network address of the source host is a media access control (MAC) address of the source host and wherein a second network address of the destination host is a MAC address of the destination host, wherein the packets addressed to the multicast address are sent to the first network address of the source host and the second network address of destination host.

11. The system of claim 9, wherein, responsive to the migration process being complete, the destination host to notify the hosts in the network to send the packets destined to the virtual machine using a network address of the destination host in the destination address field of the packets and to stop using the multicast address.

12. The system of claim 9, wherein the network comprises an encapsulated network, and wherein the notification to begin encapsulating the packets is to cause the hosts to switch from sending encapsulated packets addressed to the virtual machine using a unicast address of the source host to using the multicast address.

13. The system of claim 9, wherein the processing device to obtain the multicast address further comprises the processing device to send an internet group management protocol (IGMP) request for the multicast address to a network component of the network.

14. A non-transitory computer-readable media storing instructions that, when executed, cause a processing device to:
  determine, by a processing device, that a migration process for migration of a virtual machine from a source host to a destination host has initiated, wherein the source host and the destination host are part of a network, wherein the network comprises an encapsulated network;
  obtain, by the processing device, a multicast address that is mapped to a group comprising the source host and the destination host; and
  notify, by the processing device, hosts in the network to begin encapsulating packets addressed to the virtual machine and send the encapsulated packets using the multicast address in a destination address field of the encapsulated packets, wherein the notification to begin encapsulating the packets is to cause the hosts to switch from sending encapsulated packets addressed to the virtual machine using a unicast address of the source host to using the multicast address.

15. The non-transitory computer-readable media of claim 14, wherein a first network address of the source host is a media access control (MAC) address of the source host and wherein a second network address of the destination host is a MAC address of the destination host, wherein the packets addressed to the multicast address are sent to the first network address of the source host and the second network address of destination host.

16. The non-transitory computer-readable media of claim 14, wherein, responsive to the migration process being complete, the destination host to notify the hosts in the network to send the packets destined to the virtual machine using a network address of the destination host in the destination address field of the packets and to stop using the multicast address, and wherein the multicast address is reused after the hosts in the network stop using the multicast address for the virtual machine.

17. The non-transitory computer-readable media of claim 14, wherein the network comprises a non-encapsulated network, and wherein the notification to begin encapsulating the packets is to cause the hosts to add encapsulation to packets destined to the virtual machine, the encapsulation comprising the multicast address.

* * * * *